United States Patent
Komuro (10) Patent No.: US 11,167,746 B2
(45) Date of Patent: Nov. 9, 2021

(54) CONTROL APPARATUS AND CONTROL METHOD FOR VEHICLE

(71) Applicant: SUBARU CORPORATION, Tokyo (JP)

(72) Inventor: Masaki Komuro, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 405 days.

(21) Appl. No.: 16/375,982

(22) Filed: Apr. 5, 2019

(65) Prior Publication Data

US 2019/0359201 A1 Nov. 28, 2019

(30) Foreign Application Priority Data

May 23, 2018 (JP) .............................. JP2018-098980

(51) Int. Cl.
- *B60W 20/17* (2016.01)
- *B60W 20/13* (2016.01)
- *B60W 10/06* (2006.01)
- *B60W 10/08* (2006.01)

(52) U.S. Cl.
CPC .......... *B60W 20/17* (2016.01); *B60W 10/06* (2013.01); *B60W 10/08* (2013.01); *B60W 20/13* (2016.01); *B60W 2510/244* (2013.01); *B60W 2710/0627* (2013.01); *B60W 2710/0644* (2013.01); *B60W 2710/0666* (2013.01); *B60W 2710/083* (2013.01); *B60Y 2200/92* (2013.01)

(58) Field of Classification Search
CPC ...... B60W 20/17; B60W 20/13; B60W 10/06; B60W 10/08; B60W 2710/083; B60W 2510/244; B60W 2710/0644; B60W 2710/0666; B60W 2710/0627; B60Y 2200/92
See application file for complete search history.

(56) References Cited

U.S. PATENT DOCUMENTS

2018/0147931 A1* 5/2018 Toyota ................... B60W 10/11

FOREIGN PATENT DOCUMENTS

| JP | 2008-144859 | A |   | 6/2008  |            |
|----|-------------|---|---|---------|------------|
| JP | 2008144859  | A | * | 6/2008  |            |
| JP | 2013107459  | A | * | 6/2013  |            |
| JP | 2014213819  | A | * | 11/2014 |            |
| JP | 5716777     | B2| * | 5/2015  | B60L 50/62 |

* cited by examiner

*Primary Examiner* — Thomas G Black
*Assistant Examiner* — Tarek Elarabi
(74) *Attorney, Agent, or Firm* — Troutman Pepper Hamilton Sanders LLP (57) ABSTRACT

A control apparatus for a vehicle capable of transmitting an output of a motor and an output of an engine to a driving wheel includes: an engine controller; a motor controller; a charge capacity acquirer; and a control target setter. The engine controller controls the engine on a basis of an engine operating point line set in accordance with an engine speed, a target torque, and a fuel consumption rate. The motor controller performs an assist driving with the motor when the target torque exceeds an assist threshold line set in accordance with the engine speed. The charge capacity acquirer acquires an information of a charge capacity of a secondary battery that supplies the motor with an electric power.

6 Claims, 7 Drawing Sheets

CONTROL APPARATUS AND CONTROL METHOD FOR VEHICLE

CROSS-REFERENCE TO RELATED APPLICATIONS

The present application claims priority from Japanese Patent Application No. 2018-098980 filed on May 23, 2018, the entire contents of which are hereby incorporated by reference.

FIELD OF THE INVENTION

The disclosure relates to a control apparatus and control method for a vehicle.

BACKGROUND

In recent years, as a power source of a vehicle such as an automobile, a hybrid vehicle including both an engine and a motor has been known. A mode of the hybrid vehicle includes a hybrid vehicle capable of transmitting an output of the engine and an output of a motor to each of the driving wheels. In such a hybrid vehicle, in a cruising state, the vehicle is driven with only the output of the engine on the basis of an engine operating point line set in accordance with the engine speed, the target torque and the fuel consumption rate. Meanwhile, when the target torque exceeds an assist threshold set in accordance with the engine speed, for instance, when a driver steps on the accelerator more, a motor is used to output the assist torque to respond to an acceleration request.

Here, it is known that a vehicle including an engine has booming noise caused by driving the engine in the vehicle compartment. Therefore, technology is proposed that adjusts the operating point of the engine to reduce booming noise. For instance, Japanese Unexamined Patent Application Publication No. 2008-144859 discloses technology of using a booming noise occurrence region avoiding mechanism to change the ratio between the engine torque and the assist torque of a motor decided on the basis of the system efficiency in the case where it is determined that a booming noise occurrence region needs to be avoided.

SUMMARY

An aspect of the disclosure provides a control apparatus for a vehicle capable of transmitting an output of a motor and an output of an engine to a driving wheel. The control apparatus includes an engine controller, a motor controller, a charge capacity acquirer, and a control target setter. The engine controller is configured to control the engine on a basis of an engine operating point line set in accordance with an engine speed, a target torque, and a fuel consumption rate. The motor controller is configured to perform an assist driving with the motor when the target torque exceeds an assist threshold line set in accordance with the engine speed. The charge capacity acquirer is configured to acquire an information of a charge capacity of a secondary battery that supplies the motor with an electric power. The control target setter is configured to change at least the assist threshold line such that an operating point of the engine in a cruising state falls below an assist threshold in a case where the secondary battery is determined to be in a high charged state that is set in advance.

An aspect of the disclosure provides a control method for a vehicle that controls a driving force of the vehicle capable of transmitting an output of a motor and an output of an engine to a driving wheel. The control method includes: controlling the engine on a basis of an engine operating point line set in accordance with an engine speed, a target torque, and a fuel consumption rate; performing an assist driving with the motor when the target torque exceeds an assist threshold line set in accordance with the engine speed; and changing at least the assist threshold line such that an operating point of the engine in a cruising state falls below an assist threshold set in accordance with the engine speed for performing the assist driving with the motor in a case where a secondary battery that supplies the motor with an electric power is determined to be in a high charged state that is set in advance.

An aspect of the disclosure provides a control apparatus for a vehicle capable of transmitting an output of a motor and an output of an engine to a driving wheel. The control apparatus includes circuitry. The circuitry is configured to control the engine on a basis of an engine operating point line set in accordance with an engine speed, a target torque, and a fuel consumption rate. The circuitry is configured to perform an assist driving with the motor when the target torque exceeds an assist threshold line set in accordance with the engine speed. The circuitry is configured to acquire an information of a charge capacity of a secondary battery that supplies the motor with an electric power. The circuitry is configured to change at least the assist threshold line such that an operating point of the engine in a cruising state falls below an assist threshold in a case where the secondary battery is determined to be in a high charged state that is set in advance.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, some preferred but non-limiting embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

A hybrid vehicle is subjected to regenerative control that causes a motor to generate electric power with the kinematic energy of a driving wheel when the vehicle decelerates, and charges a battery with the generated electric power. This battery is characteristically likely to deteriorate when the charge capacity becomes too high. To suppress the deterioration of the battery, it is effective to shift up the operating point line of the engine when the charge capacity of the battery is high, and increase opportunities to output the assist torque of a motor.

However, when the operating point line of the engine is shifted up, the operating point of the engine shifts in the direction in which the engine speed decreases and the torque increases, and a region in which booming noise occurs is more easily entered.

It is desirable to provide a control apparatus and control method for a vehicle which enable an early escape from the state in which the charge capacity of the battery is high while suppressing the occurrence of booming noise.

<1. Overall Configuration Instance of Hybrid Vehicle>

Figure 1:
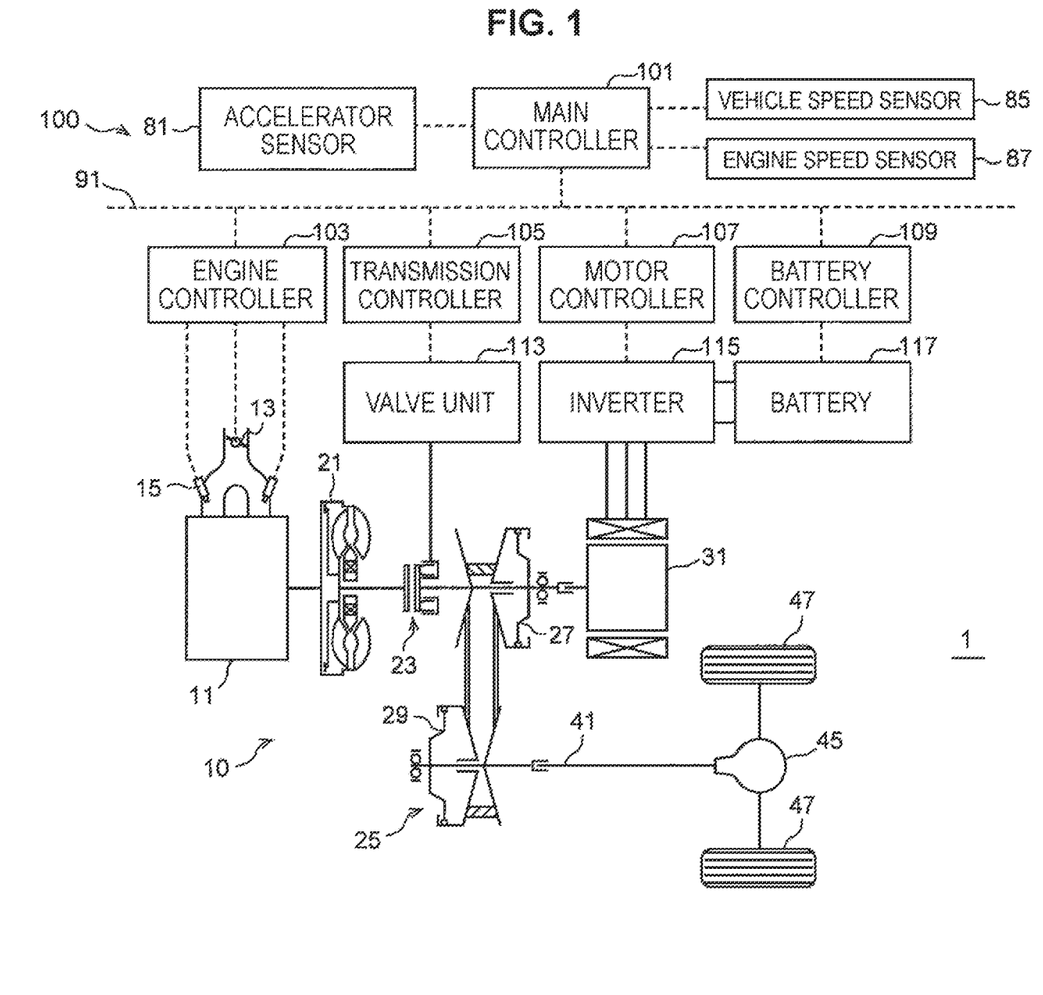
FIG. 1 is a schematic diagram illustrating a configuration instance of a hybrid vehicle to which a control apparatus for a vehicle according to an embodiment of the disclosure can be applied.

First, a configuration instance of a hybrid vehicle to which a control apparatus for a vehicle according to an embodiment of the disclosure can be applied will be described. FIG. 1 is a schematic diagram illustrating a hybrid vehicle 1 including a control apparatus 100 for a vehicle. The following describes an overall configuration instance of the hybrid vehicle 1 individually for a power unit 10 and the control apparatus (electronic control system) 100.

(1-1. Power Unit)

The power unit 10 of the hybrid vehicle 1 includes, as power sources, an engine 11 and a motor generator 31. The motor generator 31 functions as a drive motor. In addition, the power unit 10 includes a continuously variable transmission (which will also be referred to as "CVT" below) 25 including a primary pulley 27 and a secondary pulley 29.

One of the sides of the shaft of the primary pulley 27 is linked to the engine 11 via a torque converter 21. The other side of the shaft of the primary pulley 27 is linked to the motor generator 31. The shaft of the secondary pulley 29 is linked to driving wheels 47 via a driving wheel output shaft 41 and a differential mechanism 45. In this way, the driving wheels 47 are linked to the motor generator 31 and the engine 11.

The motor generator 31 is coupled to a battery 117 via an inverter 115. The inverter 115 has a function of mutually converting direct-current power and alternating-current power. When the motor generator 31 is controlled in a power running state, the inverter 115 converts direct-current power into alternating-current power and the motor generator 31 is supplied with electric power from the battery 117 via the inverter 115. Meanwhile, the motor generator 31 is controlled in a power generating state, that is, a regenerative state, the inverter 115 converts alternating-current power into direct-current power and the battery 117 is supplied with electric power from the motor generator 31 via the inverter 115.

There is provided an engine clutch 23 that is switched between an engaged state and a release state between the torque converter 21 and the primary pulley 27, that is, between the engine 11 and the driving wheels 47. Switching the engine clutch 23 to the engaged state couples the torque converter 21 to the primary pulley 27, and couples the engine 11 to the driving wheels 47. In this way, in the engaged state of the engine clutch 23, drive control is performed in a parallel driving mode in which the power of the engine 11 and the motor generator 31 is transmitted to the driving wheels 47.

Meanwhile, switching the engine clutch 23 to the release state uncouples the torque converter 21 from the primary pulley 27, and the engine 11 is uncoupled from the driving wheels 47. Even in the case where the engine 11 is uncoupled from the driving wheels 47, the coupled state between the driving wheels 47 and the motor generator 31 remains. That is, switching the engine clutch 23 to the release state makes it possible to uncouple the driving wheels 47 and the engine 11 from each other in the state in which the driving wheels 47 and the motor generator 31 are coupled to each other. In this way, in the release state of the engine clutch 23, drive control is performed in the electrically-operated driving mode in which only the power of the motor generator 31 is transmitted to the driving wheels 47.

(1-2. Control Apparatus)

The overall configuration of the control apparatus 100 for the hybrid vehicle 1 will be described. As illustrated in FIG. 1, the hybrid vehicle 1 includes a variety of controllers including microcomputers and the like to control the working state of the power unit 10. As the variety of controllers, an engine controller 103, a transmission controller 105, a motor controller 107, a battery controller 109, and a main controller 101 are included.

Some or all of the respective controllers may include, for instance, microcomputers, microprocessor units, and the like. In addition, some or all of the respective controllers may include firmware and the like that can be updated, or may be program modules and the like that are executed in accordance with an instruction from a CPU and the like.

In addition, each controller includes a storage (not illustrated) that stores a program executed by a microcomputer and the like, information of a parameter, detection data and a calculation result which is used for various kinds of calculation, and the like. The storage may be, for instance, a storage element such as a random access memory (RAM) or a read only memory (ROM), or may also be a storage such as a hard disk drive (HDD), a CD-ROM, or a storage apparatus.

The engine controller 103 controls the engine 11. The transmission controller 105 controls the CVT 25 and the like. The motor controller 107 controls the motor generator 31. The battery controller 109 controls the battery 117. The main controller 101 integrally controls these controllers. These controllers are coupled to each other via one or more in-vehicle networks 91 such as controller area networks (CANs) or local internets (LINs) in a communicable manner.

The main controller 101 outputs a control signal to each controller, and causes the engine 11, the motor generator 31, and the like included in the power unit 10 to cooperate with each other for control. The main controller 101 is coupled to an accelerator sensor 81, a vehicle speed sensor 85, and an engine speed sensor 87. The accelerator sensor 81 detects the operation amount of an accelerator pedal. The vehicle speed sensor 85 detects vehicle speed. The engine speed sensor 87 detects engine speed that is the rotational speed of a crankshaft.

The main controller 101 sets the control target of the engine 11, the motor generator 31 or the like on the basis of information transmitted from each sensor or controller, and outputs a control signal to each controller on the basis of the set control target. Each controller that receives a control signal from the main controller 101 controls the engine 11, the motor generator 31, or the like as follows.

That is, the engine controller 103 outputs control signals to a throttle valve 13, an injector 15, and the like to control the engine torque, the engine speed, and the like. The transmission controller 105 outputs a control signal to a valve unit 113 that adjusts the pressure of a working fluid, and controls the working state of the CVT 25, the engine clutch 23, the torque converter 21, and the like. The motor controller 107 outputs a control signal to the inverter 115 to control the motor torque, motor rotational speed, and the like of the motor generator 31. The battery controller 109 monitors the charging and discharging of the battery 117, and controls the relay and the like inside the battery 117 as required. In this way, the respective controllers control the engine 11, the motor generator 31, the engine clutch 23, and the like.

<2. Specific Instance of Control Apparatus>

Next, a specific instance of the control apparatus 100 for the hybrid vehicle 1 according to the present embodiment will be described.

Figure 2:
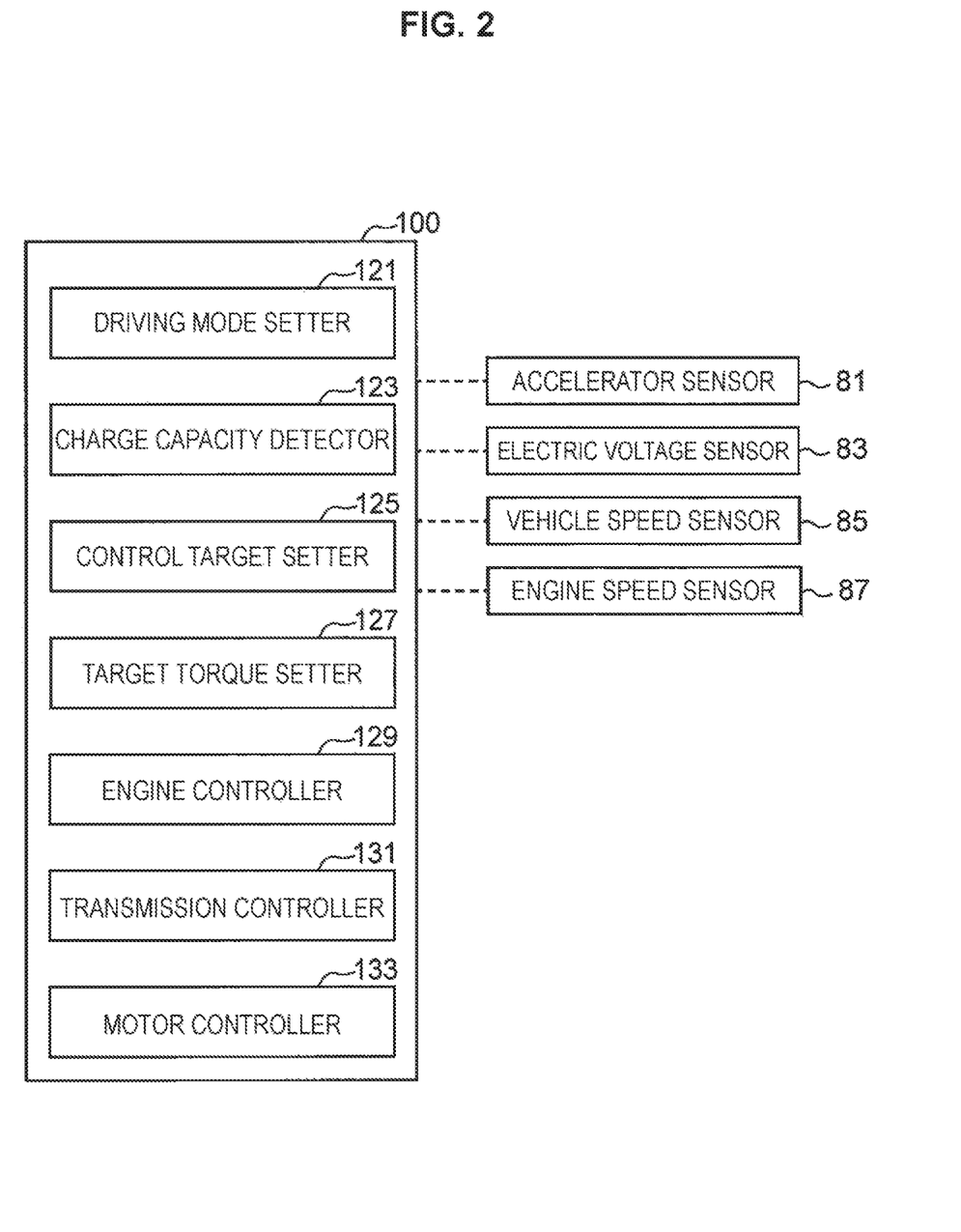
FIG. 2 is a block diagram illustrating a configuration instance of the control apparatus for a vehicle according to the embodiment.

FIG. 2 is an explanatory diagram illustrating the functional configuration of a part of the control apparatus 100 for a vehicle including the controllers illustrated in FIG. 1 which is related to driving mode switching control. The control apparatus 100 includes a driving mode setter 121, a charge capacity detector 123, a control target setter 125, a target torque setter 127, an engine controller 129, a transmission controller 131, and a motor controller 133.

(Driving Mode Setter)

For instance, the main controller 101 functions as the driving mode setter 121. The driving mode setter 121 switches the driving mode of the hybrid vehicle 1 to the electrically-operated driving mode and the parallel driving mode on the basis of target torque calculated by the target torque setter 127 and the vehicle speed which is obtained on the basis of a signal of the vehicle speed sensor 85. The electrically-operated driving mode is a driving mode for transmitting only the power of the motor generator 31 to the driving wheels 47. The parallel driving mode is a driving mode for transmitting the power of the motor generator 31 and the engine 11 to the driving wheels 47.

Figure 3:
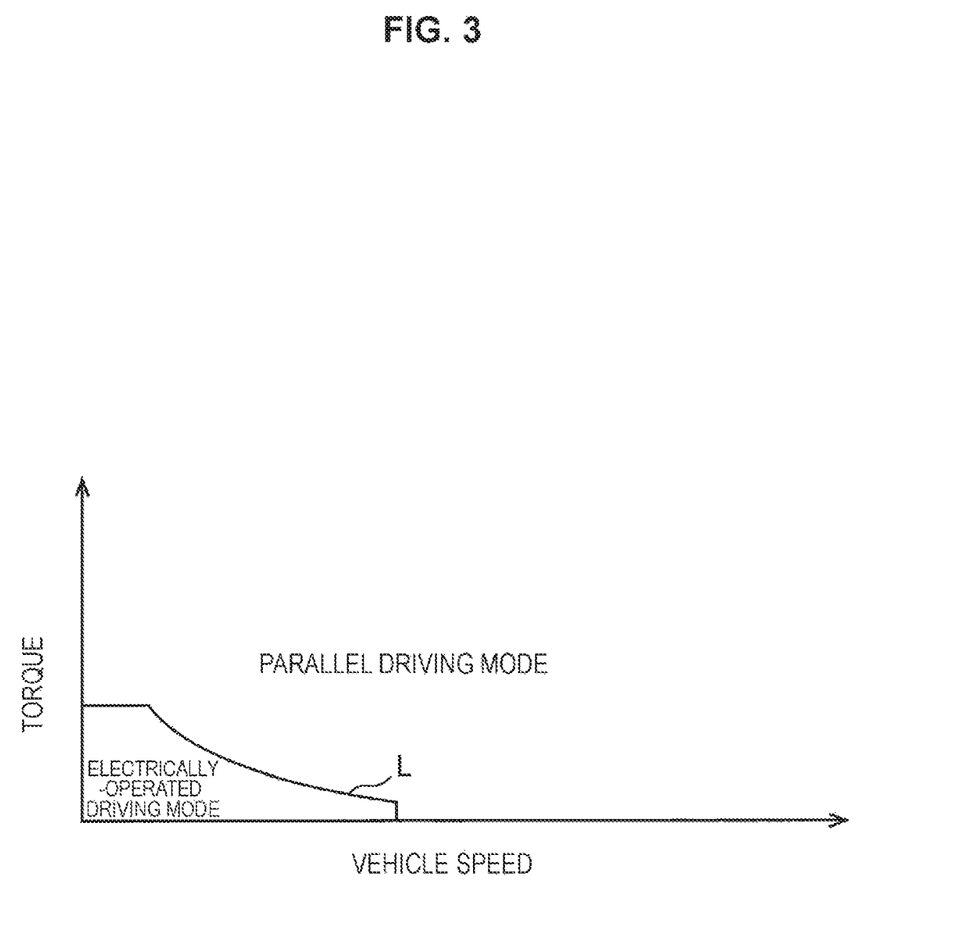
FIG. 3 is an explanatory diagram illustrating region setting of a driving mode.

FIG. 3 is an explanatory diagram illustrating the outline of region setting of the driving mode. The hybrid vehicle 1 is set at the electrically-operated driving mode when the target torque is lower than or equal to an EV end line L set in accordance with the vehicle speed, and set at the parallel driving mode when the target torque exceeds the EV end line L. The EV end threshold is set to be smaller as vehicle speed increases.

(Charge Capacity Detector)

For instance, the battery controller 109 functions as the charge capacity detector 123. The charge capacity detector 123 detects a charge capacity SOC of the battery 117 on the basis of a signal of the electric voltage sensor 83 provided to the battery 117.

(Control Target Setter)

For instance, the main controller 101 functions as the control target setter 125. The control target setter 125 sets control targets for controlling the engine 11 and the motor generator 31 during the parallel driving mode. While basically using a basic control map as a control target, the control target setter 125 changes the control map in the case where it is determined that the battery 117 is in a high charged state set in advance.

In the present embodiment, in the case where the charge capacity SOC of the battery 117 exceeds a reference value SOC_0 set in advance, the control target setter 125 determines the state of the battery 117 as a high charged state and changes the control map. This reference value SOC_0 may be a value that varies in accordance with the temperature of the battery 117, the ambient temperature, the period of time for which the battery 117 is used, or the like. In addition, a method for determining the state of the battery 117 as the high charged state is not limited to the instance described above.

The control target setter 125 changes at least an assist threshold line such that the operating point of the engine 11 in a cruising state exceeds an assist threshold. This causes motor torque (assist torque) to be constantly output in the cruising state of the hybrid vehicle 1 from the motor generator 31, and the charge capacity SOC of the battery 117 decreases early.

The control target setter 125 may make only a change of lowering the assist threshold line, or may lower the assist threshold line and shift up an engine operating point line. However, in the case where the operating point line is shifted up, the shift width is kept from entering a driving region (which will also be referred to as "booming noise occurrence region" below) in which booming noise occurs in the vehicle.

Specifically, booming noise in the vehicle is likely to occur in a driving region in which the engine speed is low and the engine torque is high. Once the engine operating point line is shifted up too much, the operating point of the engine 11 in the cruising state more easily enters the booming noise occurrence region. Therefore, the shift width or the shift possible range for shifting up the engine operating point line may be set in advance in accordance with the characteristics of the hybrid vehicle 1.

Figure 4:
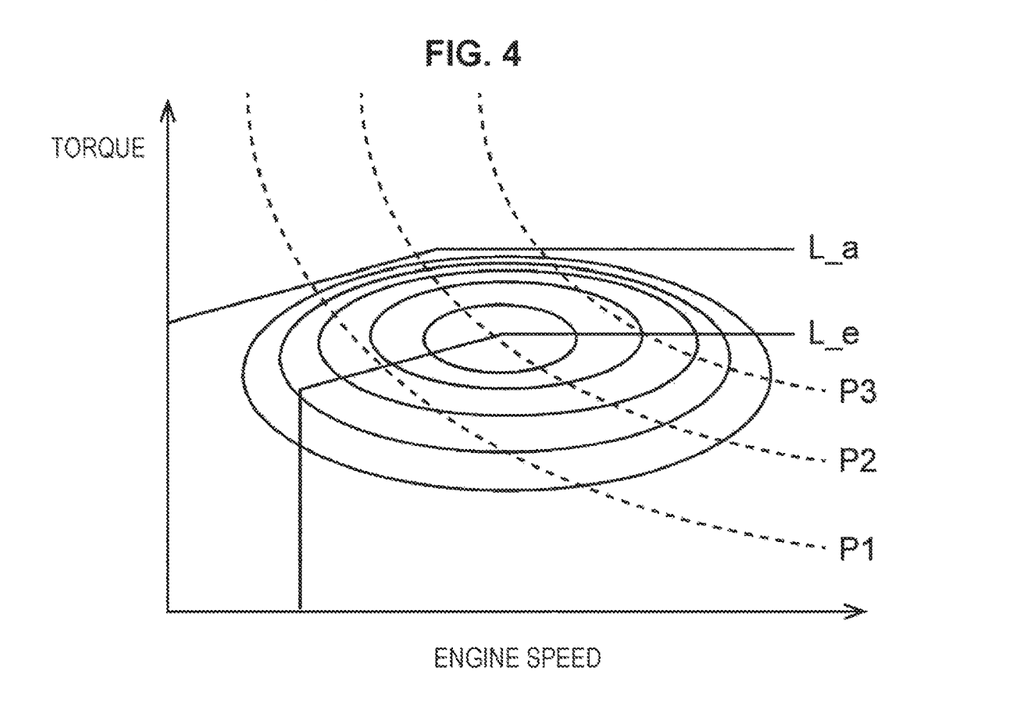
FIG. 4 is an explanatory diagram illustrating an instance of a basic control map in a parallel driving mode.
Figure 5:
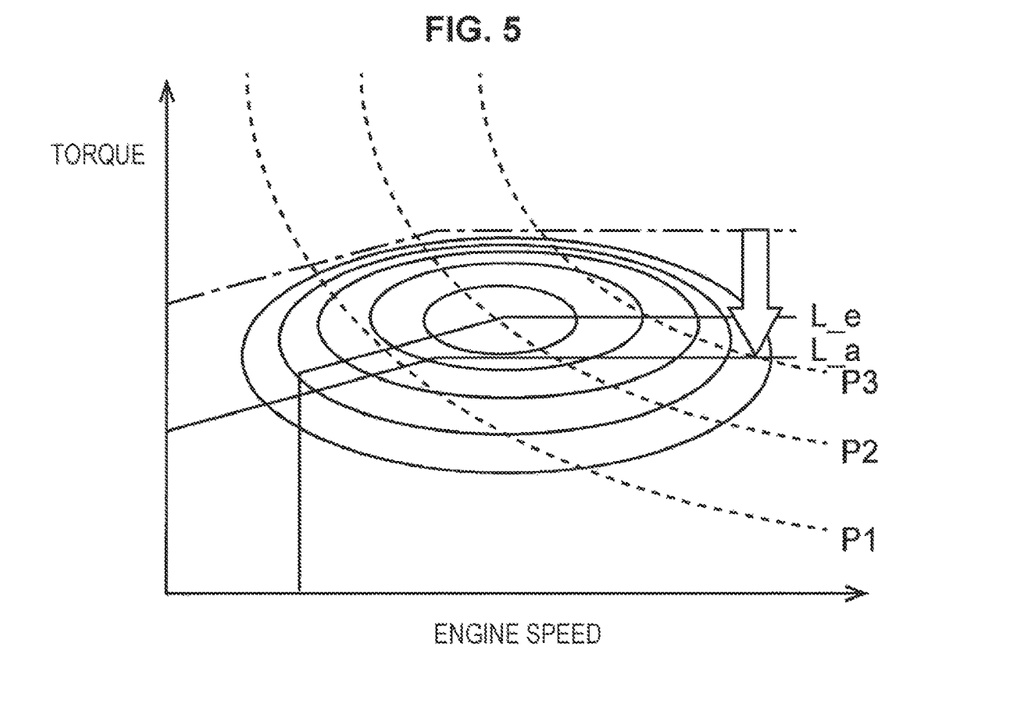
FIG. 5 is an explanatory diagram illustrating an instance of a changed control map.

With reference to FIGS. 4 and 5, it will be described how to change a control map. FIG. 4 illustrates a basic control map, and FIG. 5 illustrates a changed control map. FIGS. 4 and 5 illustrate an output line (dashed line) and a fuel consumption rate contour line such as an engine operating point line L_e and an assist threshold line L_a.

In the basic control map illustrated in FIG. 4, the fuel consumption rate contour line represents the fuel consumption rate of the engine 11 for each operating point. The engine operating point line L_e is a line obtained by coupling operating points (engine torque and engine speed) at which the engine 11 has a highly efficient fuel consumption rate, and is set in accordance with the engine speed, the target torque and the fuel consumption rate. During the parallel driving mode, the engine torque corresponding to the engine speed is set with this operating point used as a control target in the cruising state of the hybrid vehicle 1. The assist threshold line L_a is a line obtained by coupling thresholds of the target torque that generates assist torque from the motor generator 31, and is set in accordance with the engine speed.

FIG. 5 illustrates an instance of a control map in the case where the charge capacity SOC of the battery 117 exceeds the reference value SOC_0. In the instance of this control map, the control map is changed by lowering the assist threshold line L_a such that the engine operating point line L_e exceeds the assist threshold line L_a. In the case where the changed control map is used, the engine operating point line L_e is constantly greater than the assist threshold line L_a in the cruising state of the hybrid vehicle 1. Accordingly, the motor generator 31 constantly outputs motor torque.

Thus, the electric power of the battery 117 is encouraged to be consumed, and it is possible to quickly lower the charge capacity SOC of the battery 117. In addition, the operating point of the engine 11 is not displaced to a low-rotation and high-torque side, so that it is also possible to suppress the occurrence of booming noise.

(Target Torque Setter)

For instance, the main controller 101 functions as the target torque setter 127. The target torque setter 127 calculates the target torque of the hybrid vehicle 1. For instance, the target torque setter 127 refers to a torque map stored in advance in a storage, and calculates target torque on the basis of a signal of the accelerator sensor 81.

Note that in the case where the hybrid vehicle is being subjected to automated-driving control, the target torque setter 127 may calculate target torque on the basis of an acceleration request value obtained according to calculation instead of a signal of the accelerator sensor 81.

In addition, the target torque setter 127 sets the target torque as it is as motor torque while the engine clutch 23 is released and the driving mode is the electrically-operated driving mode. Meanwhile, the target torque setter 127 distributes the target torque to the engine 11 and the motor generator 31 in accordance with the control map while the engine clutch 23 is engaged and the driving mode is the parallel driving mode. In the case where the target torque is lower than or equal to an assist threshold set in advance in accordance with the engine speed, the target torque setter 127 sets the target torque as it is as engine torque.

In contrast, in the case where the target torque exceeds the assist threshold, the target torque setter 127 distributes the target torque to the engine torque and the motor torque. Specifically, the target torque for the assist threshold is set as engine torque, and the excess target torque exceeding the assist threshold is set as motor torque.

(Engine Controller)

For instance, the engine controller 103 functions as the engine controller 129. The engine controller 129 controls the opening degree of the throttle valve 13 and electric power to be supplied to the injector 15 on the basis of engine torque set by the target torque setter 127, thereby controlling engine torque output from the engine 11.

(Transmission Controller)

For instance, the transmission controller 105 functions as the transmission controller 131. The transmission controller 131 switches the engine clutch 23 to the engaged state or the release state in accordance with the set driving mode. In addition, the transmission controller 131 controls the CVT 25 in accordance with a shift line set in advance in accordance with the vehicle speed and the target torque.

(Motor Controller)

For instance, the motor controller 107 functions as the motor controller 133. The motor controller 133 controls electric power to be supplied to the inverter 115 on the basis of motor torque set by the target torque setter 127, and controls motor torque output from the motor generator 31.

<3. Operation Instance of Control Apparatus>

The configuration instance of the control apparatus 100 for the hybrid vehicle 1 according to the present embodiment has been described so far. The following describes an instance of a drive control process for the hybrid vehicle 1 which is performed by the control apparatus 100.

Figure 6:
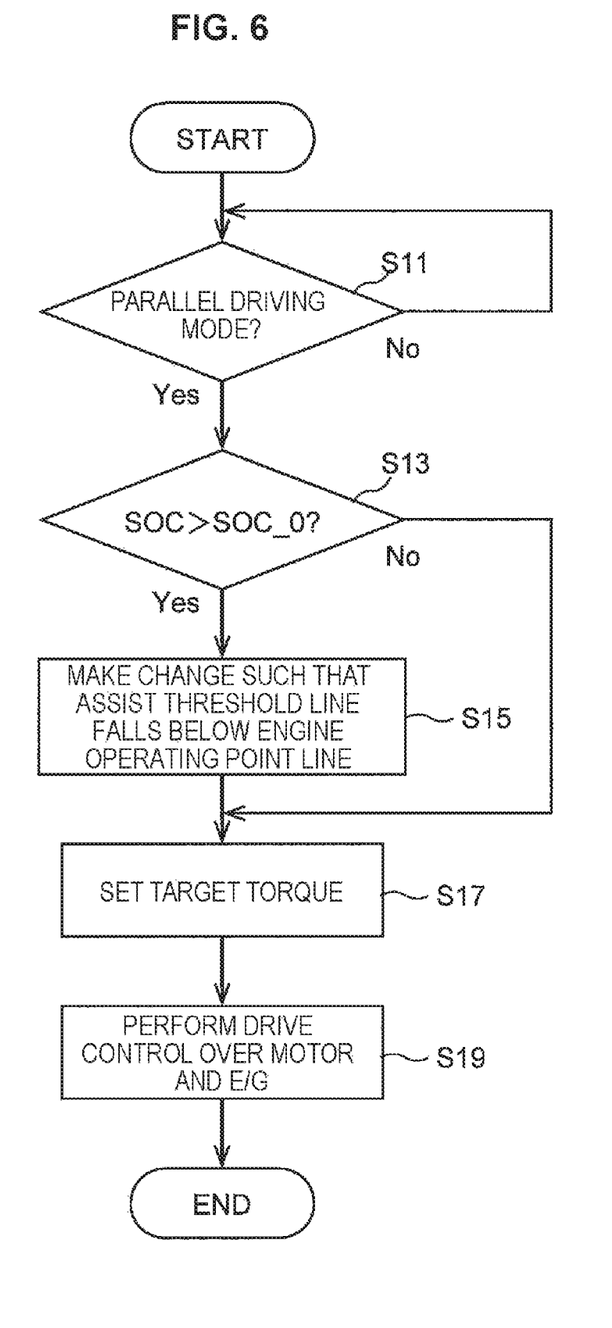
FIG. 6 is a flowchart illustrating an instance of a control method for a vehicle according to the embodiment.

FIG. 6 is a flowchart illustrating an instance of a drive control process for the hybrid vehicle 1 which is performed by the control apparatus 100. This flowchart illustrates a drive control process in the case where the driving mode is the parallel driving mode.

First, the control target setter 125 determines whether the driving mode of the hybrid vehicle 1 is the parallel driving mode (step S11). In the case where the driving mode is not the parallel driving mode, that is, in the case where the driving mode is the electrically-operated driving mode (S11/No), the control target setter 125 repeats the determination of step S11 until the driving mode becomes the parallel driving mode.

In contrast, in the case where the driving mode is the parallel driving mode (S11/Yes), the control target setter 125 determines whether the charge capacity SOC of the battery 117 is higher than the reference value SOC_0 set in advance (step S13). The reference value SOC_0 is set at an appropriate value for the charge capacity SOC at which the electrodes of the battery 117 are likely to deteriorate such as eroding. For instance, the reference value SOC_0 can be set at a value within a range of 85 to 95%.

In the case where the charge capacity SOC of the battery 117 is lower than or equal to the reference value SOC_0 (S13/No), the control target setter 125 does not change the reference control map, but proceeds to step S17. In contrast, in the case where the charge capacity SOC of the battery 117 exceeds the reference value SOC_0 (S13/Yes), the control target setter 125 changes the control map such that the assist threshold line falls below the engine operating point line (step S15).

At that time, the control target setter 125 at least lowers the assist threshold line to change the control map. In the case where the engine operating point line is not shifted up, but only the assist threshold line is lowered, the operating point of the engine 11 is not displaced to the low-rotation and high-torque side. Accordingly, it is possible to enhance the effect of suppressing the occurrence of booming noise in the vehicle. In addition, even in the case where the engine operating point line is shifted up while the assist threshold line is lowered, setting the shift width or shift possible range of the engine operating point line in advance such that the booming noise occurrence region is not entered makes it possible to suppress the occurrence of booming noise in the vehicle.

In addition, in the case where the control map is changed, the control target setter 125 may set the reduction width of the assist threshold line or a difference between the engine operating point line and the assist threshold line after at least the assist threshold line is changed, in accordance with the charge capacity SOC of the battery 117. Specifically, the control map may be changed such that the reduction width of the assist threshold line increases or a difference between the engine operating point line and the assist threshold line after at least the assist threshold line is changed increases with an increase in the charge capacity SOC of the battery 117. This causes the motor generator 31 to output more assist torque, and can encourage the electric power of the battery 117 to be consumed.

Next, the target torque setter 127 calculates the target torque of the hybrid vehicle 1, and sets the engine torque and the motor torque in accordance with the control map (step S17). Next, the engine controller 129 and the motor controller 133 respectively controls the engine 11 and the motor generator 31 on the basis of the set engine torque and motor torque (step S19).

<4. Effect by Control Apparatus>

Figure 7:
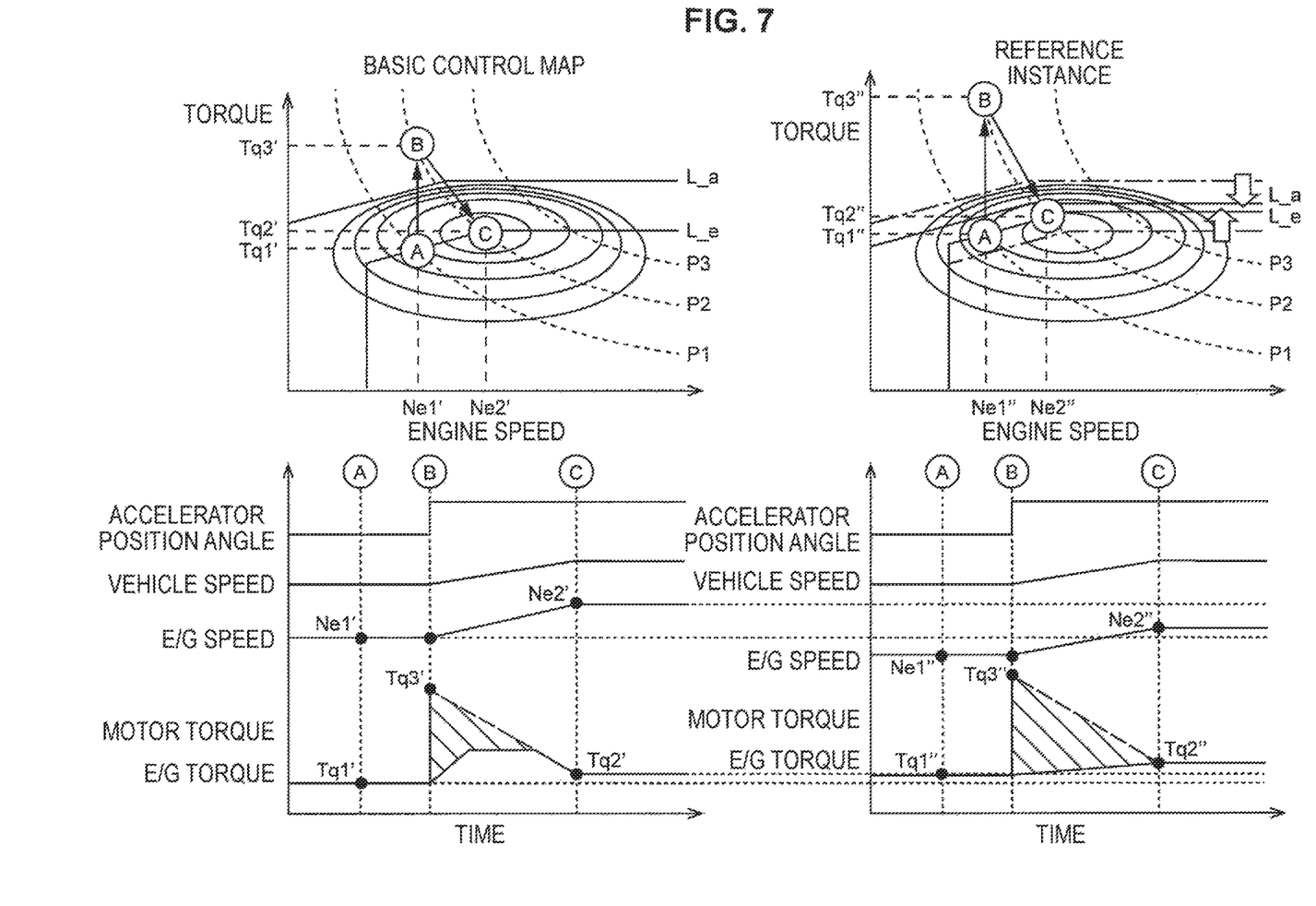
FIG. 7 is an explanatory diagram illustrating an effect of a control method for a vehicle according to a reference instance.
Figure 8:
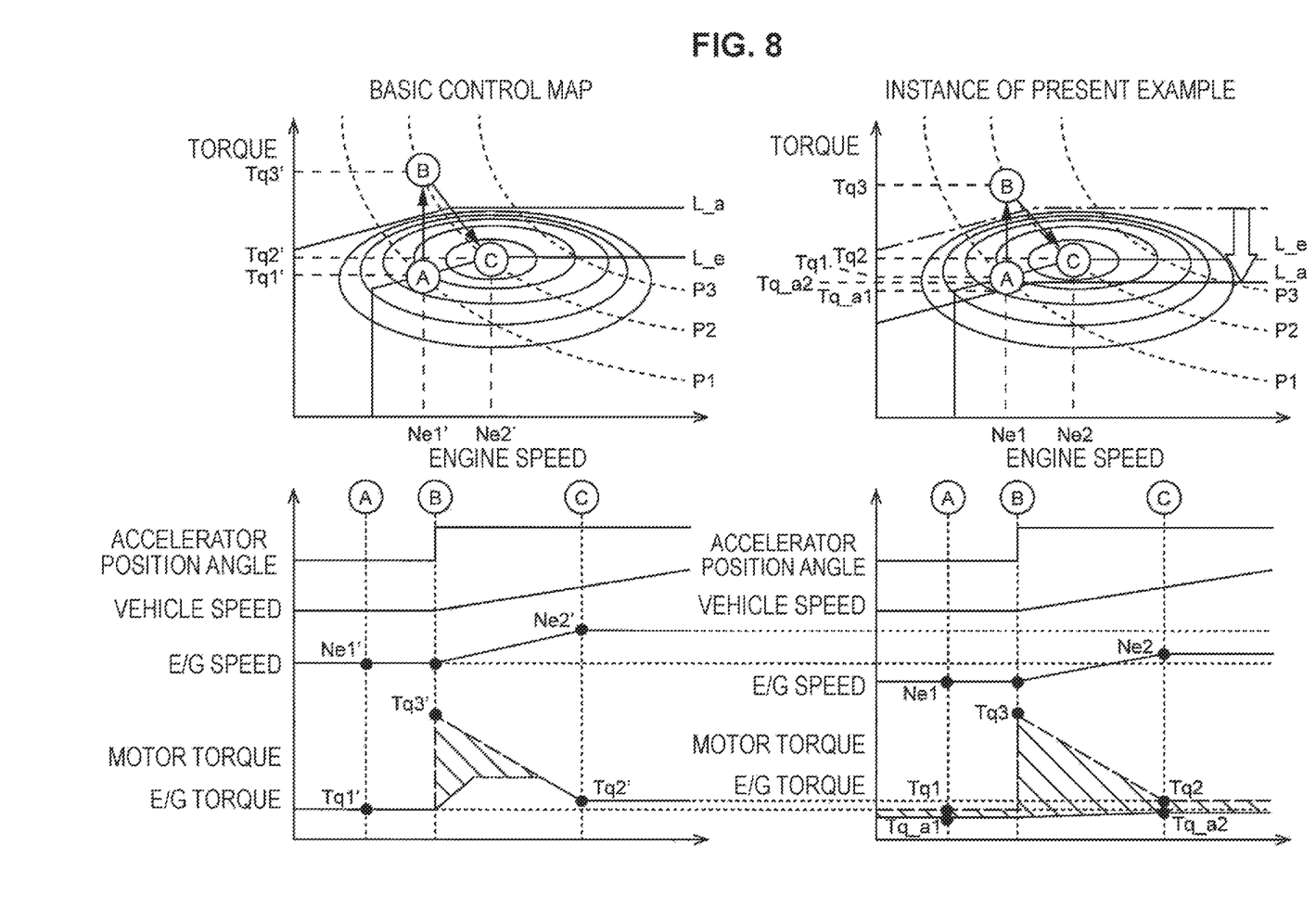
FIG. 8 is an explanatory diagram illustrating an instance of the control method for a vehicle according to an instance of the present embodiment.

Next, with reference to FIGS. 7 and 8, the effect of the control apparatus 100 for a vehicle according to the present embodiment will be described. FIG. 7 illustrates a reference instance in which the engine operating point line L_e is shifted up as compared with the basic control map, and the assist threshold line L_a is lowered to the degree to which the assist threshold line L_a does not fall below the engine operating point line L_e to increase opportunities to drive the motor generator 31. FIG. 8 illustrates an instance of the present embodiment in which the assist threshold line L_a is lowered as compared with the basic control map such that the assist threshold line L_a falls below the engine operating line L_e.

Here, description will be made by using, as an instance, the case where a driver steps on the accelerator more in the state in which the hybrid vehicle 1 is cruising with an output P1, and a request output changes from the output P1 to an output P2 (state A→state B→state C) as illustrated on the respective left sides of FIGS. 7 and 8.

In the case where the battery 117 is not in the high charged state, but the basic control map is used to perform drive control over the hybrid vehicle 1, the hybrid vehicle 1 is cruising with engine speed Ne1' and engine torque Tq1' (output P1) in the first state A.

In the state B in which a driver steps on the accelerator more, target torque Tq3' exceeds the assist threshold line L_a. In this case, there is no increasing the engine torque instantaneously, so that the motor generator 31 is caused to output an increment in torque (Tq3'−Tq1') as assist torque and the increment is used as the output P2.

Afterward, while the engine torque is gradually increased within the range within which the assist threshold line L_a is not exceeded, the motor torque is decreased. In the state C, the hybrid vehicle 1 transitions to the cruising state with engine speed Ne2' and engine torque Tq2' (output P2).

In addition, in the reference instance illustrated on the right side of FIG. 7, the engine operating point line L_e is shifted up, and the assist threshold line L_a is lowered to the degree to which the assist threshold line L_a does not fall below the engine operating point line L_e. Therefore, the difference between the engine torque and the assist threshold at the operating point of the engine 11 in the cruising state is small, and the assist torque by the motor generator 31 is likely to be output.

In the case of the reference instance, the hybrid vehicle 1 is cruising with engine speed Ne1" and engine torque Tq1" (output P1) in the first state A. This engine speed Ne1" is lower than the engine speed Ne1' in the case where the basic control map is used, and the engine torque Tq1" is higher than the engine torque Tq1' in the case where the basic control map is used.

In the state B in which a driver steps on the accelerator more, target torque Tq3" exceeds the assist threshold line L_a. In this case, an increment in torque (Tq3"−Tq1") is output as the assist torque by the motor generator 31, and is used as the output P2.

Afterward, while the engine torque is gradually increased within the range within which the assist threshold line L_a is not exceeded, the motor torque is decreased. In the state C, the hybrid vehicle 1 transitions to the cruising state with engine speed Ne2" and engine torque Tq2" (output P2).

The area of a hatched region corresponding to the integration amount of the motor torque output in the reference instance is greater than the integration amount of the motor torque output in the case where the basic control map is used. Therefore, the consumed electric power amount of the battery 117 increases, and it is possible to lower the charge capacity SOC of the battery 117 early. However, in the reference instance, the operating point of the engine 11 transitions to the low-rotation and high-torque side, so that booming noise is likely to occur in the vehicle.

In contrast, in the instance of the present embodiment illustrated on the right side of FIG. 8, the assist threshold line L_a is lowered such that the engine operating line L_e in the cruising state exceeds the assist threshold line L_a. Therefore, the assist torque by the motor generator 31 is constantly output even in the cruising state.

In the case of the present embodiment, in the first state A, the engine 11 is driven with engine speed Ne1 and engine torque Tq_a1, and a difference between the target torque Tq1 and the engine torque Tq_a1 is used as the motor torque (assist torque) to drive the motor generator 31, and the hybrid vehicle 1 is cruising. This engine speed Ne1 is the same as the engine speed Ne1' in the case where the basic control map is used, and the engine torque Tq1 is lower than the engine torque Tq1' in the case where the basic control map is used.

In the state B in which a driver steps on the accelerator more, an increment in torque (Tq3−Tq1) and the assist torque by the motor generator 31 increase to serve as the output P2. Afterward, while the engine torque is gradually increased within the range within which the assist threshold line L_a is not exceeded, the motor torque is decreased. Thus, in the state C, the engine 11 is driven with engine speed Ne2 and engine torque Tq_a2, and a difference between the target torque Tq2 and the engine torque Tq_a2 is used as the motor torque (assist torque) to drive the motor generator 31, and the hybrid vehicle 1 transition to cruise.

The area of a hatched region corresponding to the integration amount of the motor torque output in the instance of the present embodiment is greater than the integration amount of the motor torque output in the case where the basic control map is used. In addition, in the instance of the present embodiment, the assist torque by the motor generator 31 is output even when cruising, so that the integration amount of motor torque is greater than the integration amount of motor torque in the reference instance. In addition, in the instance of the present embodiment, when the control map is changed, the operating point of the engine 11 is prevented from entering the region in which booming noise is likely to occur in the vehicle. Therefore, it is possible to suppress the occurrence of booming noise.

As described above, the control apparatus 100 for the hybrid vehicle 1 according to the present embodiment changes at least the assist threshold line such that the operating point of the engine 11 in the cruising state falls below the assist threshold in the case where the battery 117 is in the high charged state while the hybrid vehicle 1 is traveling in the parallel driving mode. Therefore, in the high charged state of the battery 117, the assist torque by the motor generator 31 is constantly output, and the output assist torque increases. Thus, the electric power of the battery 117 is encouraged to be consumed, and it is possible to escape the high charged state of the battery 117 early.

At that time, in the case where only the assist threshold line is lowered, but the engine operating point line is not changed, the engine operating point is not displaced to the low-rotation and high-torque side, and it is possible to enhance the effect of suppressing the occurrence of booming noise in the vehicle. In addition, even in the case where the assist threshold line is lowered, and the engine operating point line is shifted up, preventing the engine operating point line from entering the booming noise occurrence region makes it possible to escape the high charged state of the battery 117 early while suppressing the occurrence of booming noise in the vehicle.

Although the preferred embodiments of the disclosure have been described in detail with reference to the appended drawings, the disclosure is not limited thereto. It is obvious to those skilled in the art that various modifications or variations are possible insofar as they are within the technical scope of the appended claims or the equivalents thereof. It should be understood that such modifications or variations are also within the technical scope of the disclosure.

For instance, in the embodiment described above, the control apparatus 100 for a vehicle includes five controllers, but the disclosure is not limited to the instance. The functions of some or all of the controllers described above may be integrated into one controller, or further divided into controllers.

In addition, the hybrid vehicle 1 is a parallel hybrid vehicle in the embodiment described above, but the disclosure is not limited to the instance. The hybrid vehicle 1 is not limited to a parallel hybrid vehicle, but the disclosure is applicable as long as the hybrid vehicle 1 is a vehicle capable of independently transmitting power from the engine and a motor to the driving wheels.

The invention claimed is:

1. A control apparatus for a vehicle capable of transmitting an output of a motor and an output of an engine to a driving wheel, the control apparatus comprising:
   an engine controller configured to control the engine on a basis of an engine operating point line set in accordance with an engine speed, a target torque, and a fuel consumption rate;
   a motor controller configured to perform an assist driving with the motor when the target torque exceeds an assist threshold line set in accordance with the engine speed;
   a charge capacity acquirer configured to acquire an information of a charge capacity of a secondary battery that supplies the motor with an electric power; and
   a control target setter configured to change at least the assist threshold line such that an operating point of the engine in a cruising state falls below an assist threshold in a case where the secondary battery is determined to be in a high charged state that is set in advance.

2. The control apparatus for a vehicle according to claim 1, wherein
   the control target setter changes the engine operating point line in such a manner that a driving region in which a booming noise occurs in the vehicle is not entered in a case where the assist threshold line is changed and the engine operating point line is shifted up.

3. The control apparatus for a vehicle according to claim 2, wherein
   the control target setter sets a reduction width of the assist threshold line or a difference between the engine operating point line and the assist threshold line after at least the assist threshold line is changed, in accordance with the charge capacity of the secondary battery.

4. The control apparatus for a vehicle according to claim 1, wherein
   the control target setter sets a reduction width of the assist threshold line or a difference between the engine operating point line and the assist threshold line after at least the assist threshold line is changed, in accordance with the charge capacity of the secondary battery.

5. A control method for a vehicle that controls a driving force of the vehicle capable of transmitting an output of a motor and an output of an engine to a driving wheel, the control method comprising:
   controlling the engine on a basis of an engine operating point line set in accordance with an engine speed, a target torque, and a fuel consumption rate;
   performing an assist driving with the motor when the target torque exceeds an assist threshold line set in accordance with the engine speed; and
   changing at least the assist threshold line such that an operating point of the engine in a cruising state falls below an assist threshold set in accordance with the engine speed for performing the assist driving with the motor in a case where a secondary battery that supplies the motor with an electric power is determined to be in a high charged state that is set in advance.

6. A control apparatus for a vehicle capable of transmitting an output of a motor and an output of an engine to a driving wheel, the control apparatus comprising:
   circuitry configured to
      control the engine on a basis of an engine operating point line set in accordance with an engine speed, a target torque, and a fuel consumption rate,
      perform an assist driving with the motor when the target torque exceeds an assist threshold line set in accordance with the engine speed,
      acquire an information of a charge capacity of a secondary battery that supplies the motor with an electric power, and
      change at least the assist threshold line such that an operating point of the engine in a cruising state falls below an assist threshold in a case where the secondary battery is determined to be in a high charged state that is set in advance.

\* \* \* \* \*